US008830352B2

(12) United States Patent
Ebihara et al.

(10) Patent No.: US 8,830,352 B2
(45) Date of Patent: Sep. 9, 2014

(54) IMAGE PICKUP DEVICE (75) Inventors: Hiroaki Ebihara, Kanagawa (JP);
Yoshikazu Nitta, Tokyo (JP); Hirotaka Kitami, Kanagawa (JP)

(73) Assignee: Sony Corporation, Tokyo (JP)

( * ) Notice: Subject to any disclaimer, the term of this patent is extended or adjusted under 35 U.S.C. 154(b) by 29 days.

(21) Appl. No.: 13/497,373

(22) PCT Filed: Sep. 14, 2010

(86) PCT No.: PCT/JP2010/065811
§ 371 (c)(1),
(2), (4) Date: Sep. 24, 2012

(87) PCT Pub. No.: WO2011/037040
PCT Pub. Date: Mar. 31, 2011

(65) Prior Publication Data
US 2013/0016238 A1    Jan. 17, 2013

(30) Foreign Application Priority Data
Sep. 28, 2009 (JP) ................ P2009-223476

(51) Int. Cl.
H04N 5/235 (2006.01)
H04N 5/343 (2011.01)
H04N 9/04 (2006.01)
H04N 5/345 (2011.01)

(52) U.S. Cl.
CPC ........... *H04N 9/045* (2013.01); *H04N 5/343* (2013.01); *H04N 5/3456* (2013.01); *H04N 5/3458* (2013.01)
USPC .................... 348/230.1; 348/220.1

(58) Field of Classification Search
None
See application file for complete search history.

(56) References Cited

U.S. PATENT DOCUMENTS

2010/0053356 A1*  3/2010  Tsunekawa et al. ....... 348/222.1

FOREIGN PATENT DOCUMENTS

| JP | 2000-134549 | 5/2000 |
| JP | 2001-145025 | 5/2001 |
| JP | 2003-338933 | 11/2003 |
| JP | 2007-104450 | 4/2007 |
| JP | 2007-295230 | 11/2007 |
| JP | 2009-088940 | 4/2009 |
| JP | 2009-130580 | 6/2009 |
| WO | WO/2008/053791 | 5/2008 |

OTHER PUBLICATIONS

WO 2008053791, Tsunekawa et al., Aug. 5, 2008, Imaging Device and Video Signal Generating Method Employed in Imaging Device.*
Japanese Patent Office Action issued in connection with related Japanese Patent Application No. JP 2009-223476 dated Dec. 10, 2013.

* cited by examiner

*Primary Examiner* — Twyler Haskins
*Assistant Examiner* — Angel L Garces-Rivera
(74) *Attorney, Agent, or Firm* — Dentons US LLP (57) ABSTRACT

There is provided an image pickup device which eliminates the need for image processing different from one frame to another, and is capable of eliminating centroid displacement without additionally performing a centroid correction process, thereby improving an S/N ratio and image quality. A controller 140 sequentially reads signals from all pixels when an operation mode control signal designates all-pixel readout mode, whereas, controls to read a signal from a different pixel while varying a readout position from one field to another when the operation mode control signal designates selective readout mode, and a signal processing section 150 performs signal processing on a set of field data of a single field to output resultant data as frame data when the operation mode control signal designates all-pixel readout mode, whereas, adds up plural sets of field data over a plurality of fields to output resultant data as frame data when the operation mode control signal designates selective readout mode.

5 Claims, 10 Drawing Sheets

(A) FIELD DATA 2n (B) FIELD DATA 2n+1

IMAGE PICKUP DEVICE

TECHNICAL FIELD

The present invention relates to an image pickup device including a CMOS image sensor or the like, the image pickup device capable of performing all-pixel readout and selective readout.

BACKGROUND ART

In recent years, it is desirable for even an image sensor with high resolution to pick up a high-quality image with low resolution.

For example, a function of taking moving images by a digital still camera and, in contrast, a function of picking up a still image by a camcorder have become common Moreover, in these electronic units, in many cases, a view finder for checking a picture is included; however, the resolution of the view finder is lower than an image to be picked up.

Further, some of digital still cameras, cellular phones, and the like have a function of improving a frame rate during low-resolution image pickup to pick up images of high-speed movement which are invisible in related art.

As described above, it is desirable for one image sensor to support both of high-resolution still images at a low frame rate and relatively-low-resolution moving images at a high frame rate.

On the other hand, there is proposed a CMOS (Complementary Metal Oxide Semiconductor) image sensor supporting all-pixel readout mode in which signals are read from all pixels and selective readout mode in which signals are intermittently read by skipping a row or a column.

In this CMOS image sensor, all-pixel readout mode is used to take a high-resolution still image, and selective readout mode is used to pick up low-resolution moving images or images at a high frame rate.

PTL 1 describes a CMOS image sensor improving image quality in the case where moving images are picked up in selective readout mode.

In this method, the position of a readout pixel is changed from one frame to another to vary sampling phase and frequency, thereby reducing moire.

CITATION LIST

Patent Literature

[PTL 1] Japanese Unexamined Patent Application Publication No. 2003-338933

DISCLOSURE OF THE INVENTION

However, in this method, there are disadvantages that image processing different from one frame to another is necessary, the load of computation is large, and a necessary memory amount is also large.

Moreover, in selective readout mode, the centroids of sampled pixels are displaced between even-numbered rows and odd-numbered rows, and in PTL 1, this issue is not considered, and there is a disadvantage that a centroid correction process is additionally necessary.

The present invention provides an image pickup device which eliminates the need for image processing different from one frame to another, and is capable of eliminating centroid displacement without additionally performing a centroid correction process, thereby improving an S/N ratio and image quality.

An image pickup device of the invention includes: a pixel section including a plurality of pixels arranged in a matrix; a readout circuit performing a conversion process on an analog signal generated in the pixel section to output a resultant signal as field data; a controller controlling, in response to an operation mode control signal, to select a pixel from which a signal is to be read in the pixel section; and a signal processing section performing signal processing on the field data supplied from the readout circuit to output resultant data as frame data, in which the controller sequentially reads signals from all of the pixels when the operation mode control signal designates all-pixel readout mode, whereas, controls to read a signal from a different pixel while varying a readout position from one field to another when the operation mode control signal designates selective readout mode, and the signal processing section performs signal processing on a set of field data of a single field to output resultant data as frame data when the operation mode control signal designates all-pixel readout mode, whereas, adds up plural sets of field data over a plurality of fields to output resultant data as frame data when the operation mode control signal designates selective readout mode.

According to the invention, the need for image processing different from one frame to another is eliminated, and centroid displacement is allowed to be eliminated without additionally performing a centroid correction process, thereby improving an S/N ratio and image quality.

BEST MODE(S) FOR CARRYING OUT THE INVENTION

Embodiments of the invention will be described below referring to the accompanying drawings.

It is to be noted that description will be given in the following order.
1. First Embodiment (First configuration and function of image pickup device)
2. Second Embodiment (Second configuration and function of image pickup device)
3. Third Embodiment (Third configuration and function of image pickup device)

(1. First Embodiment)

Figure 1:
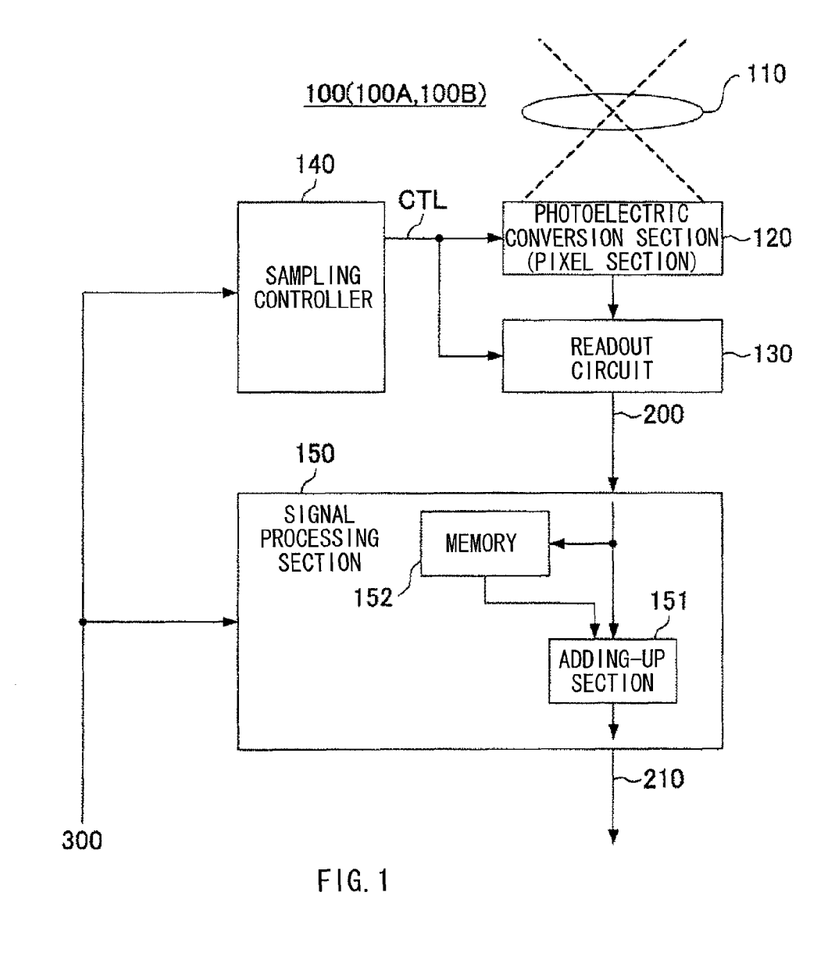
FIG. 1 is a block diagram illustrating a configuration example of an image pickup device according to a first embodiment of the invention.

FIG. 1 is a block diagram illustrating a configuration example of an image pickup device according to a first embodiment of the invention.

The image pickup device 100 includes an image pickup optical system 110, a photoelectric conversion section 120 as a pixel section, a readout circuit 130, a sampling controller 140, and a signal processing section 150.

The photoelectric conversion section 120, the readout circuit 130, the sampling controller 140, and the signal processing section 150 may be collectively mounted on one chip as a semiconductor element, or may be distributed to a plurality of chips.

The image pickup device 100 has a function of supporting at least all-pixel readout mode in which signals are read from all pixels and selective readout mode in which signals are intermittently read by skipping a row or a column.

An operation mode is changed in response to an operation mode control signal 300 supplied from externally of the image pickup device 100.

In selective readout mode, the image pickup device 100 obtains, from the photoelectric conversion section 120, data different from one field to another, and adds up the data to produce and output frame data.

The image pickup optical system 110 is configured of a lens, a mechanical shutter, and the like.

The photoelectric conversion section 120 detects light incident through the image pickup optical system 110, and generates an electrical signal according to the amount of the light.

The photoelectric conversion section 120 is configured of, for example, a CMOS (Complementary Metal Oxide Semiconductor) image sensor, and the like.

The photoelectric conversion section 120 includes a number M×N of pixels arranged in a matrix with M rows and N columns.

The pixels each include a photoelectric transducer configured of, for example, a photodiode generating a charge according to the amount of incident light.

A color filter array in which color filters with different spectral transmittances are regularly arranged is disposed in front of the pixels arranged in a matrix.

The color filter array may use, for example, a Bayer pattern (refer to FIG. 3 or FIG. 4 which will be described later) configured of RGB color filters, or a complementary color filter configured of CMYG color filters.

The readout circuit 130 reads an analog electrical signal generated in the photoelectric conversion section 120, and performs AD (Analog/Digital) conversion on the analog electrical signal to output a resultant signal as field data 200.

The sampling controller 140 controls, in response to the operation mode control signal 300, to select a pixel from which a signal is to be read from the pixels arranged in a matrix with M rows and N columns.

The sampling controller 140 sequentially reads signals from all pixels when the operation mode control signal 300 designates all-pixel readout mode.

On the other hand, the sampling controller 140 controls to read a signal from a different pixel while varying a readout position from one field to another when the operation mode control signal 300 designates selective readout mode.

For example, in the case where the readout position is changed every two fields in V¼ selective readout mode in which signals are read from ¼ of M rows, the sampling controller 140 performs the following process.

In other words, in this case, the sampling controller 140 reads data from $4x$-th rows in a field $2a$, and reads signals from $4x+2$-th rows in a field $2a+1$.

Herein, a and x each are an arbitrary integer.

The photoelectric conversion section 120 outputs, in response to a signal from the sampling controller 140, an electrical signal from a pixel 121 located in a specific row to the readout circuit 130.

The readout circuit 130 reads the electrical signal from the specific row in response to a control signal CTL from the sampling controller 140, and performs AD conversion on the electrical signal to output a resultant signal as field data 200.

Alternatively, the readout circuit 130 may read electrical signals from all columns in response to a control signal CLT from the sampling controller 140, and may perform AD conversion on the electrical signals, and output only a resultant signal from a specific column as the field data 200.

The signal processing section 150 performs signal processing on the field data 200 supplied from the readout circuit 130 to output resultant data as frame data 210 to an external device.

The signal processing section 150 includes an adding-up section 151 and a memory 152, and selects, in response to the operation mode control signal 300, whether to add up plural sets of field data 200 over a plurality of fields to output resultant data.

When the operation mode control signal 300 designates all-pixel readout mode, the signal processing section 150 performs signal processing only on a set of field data 200 of a single field to output resultant data as frame data 210.

On the other hand, when the operation mode control signal 300 designates selective readout mode, the signal processing section 150 adds up plural sets of field data 200 over a plurality of fields to output resultant data as frame data 210.

In selective readout mode, the memory 152 of the signal processing section 150 temporarily stores the field data 200 supplied from the readout circuit 130.

Moreover, in selective readout mode, the adding-up section 151 of the signal processing section 150 adds up plural sets of field data 200 stored in the memory 152 or supplied from the readout circuit 130.

More specifically, the adding-up section 151 performs adding-up (or averaging) of data at a corresponding coordinate over a plurality of fields for each of all pixels. Then, a single set of image data is produced from plural sets of image data.

In the case where the readout position is changed every m (m is an arbitrary integer) fields, the adding-up section 151 adds up m sets of field data 200 to produce one set of image data.

At this time, it is necessary for the memory 152 to store $m-1$ sets or more of field data 200.

Thus, the image pickup device 100 changes the readout position from one field to another in selective readout mode, and adds up plural sets of the field data 200 over a plurality of fields to produce the frame data 210.

Next, adding-up processing in the first embodiment will be described below.

In the adding-up processing in the image pickup device 100, one to $n-(m-1)$ frames of frame data are allowed to be obtained from n fields of field data 200.

In the adding-up processing, the number of frames of frame data 210 to be obtained from n fields of the field data 200 is allowed to be freely determined by a necessary frame rate or the like.

Figure 2:
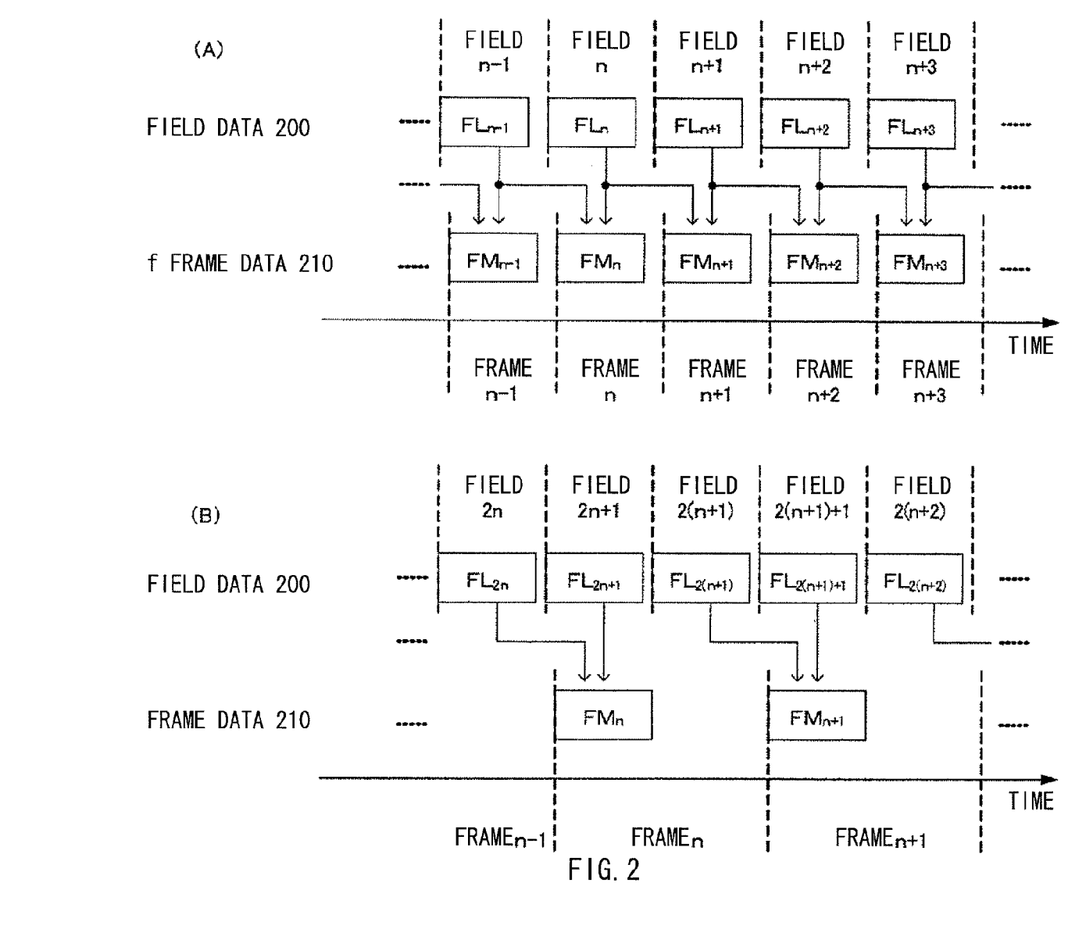
FIG. 2 is a conceptual diagram of adding-up processing in the image pickup device.

FIGS. 2(A) and 2(B) are conceptual diagrams of the adding-up processing in the image pickup device.

FIGS. 2(A) and 2(B) illustrate the case where the readout position is changed every two fields (m=2).

FIG. 2(A) illustrates an example of the case where (n−1) frames of frame data 210 are produced from n fields of the field data 200.

Frame data Fmn in a frame n is produced by performing adding-up of field data FLn in a field n and field data FLn−1 in a field n−1.

In a like manner, frame data FMn+1 in a frame n+1 is produced by performing adding-up of field data FLn+1 and FLn.

FIG. 2(B) illustrates an example of the case where n frames of frame data 210 are produced from 2n fields of field data 200.

Frame data FMn in the frame n is produced by performing adding-up of field data FL2n and FL2n+1.

In a like manner, the frame data FMn+1 in the frame n+1 is produced by performing adding-up of field data FL2(n+1) and FL2(n+1)+1.

When adding-up of the field data FLn in the field n and the field data FLn−1 in the field n−1 is performed to produce frame data FMn in the frame n, the image pickup device 100 adds up data at a same address.

In other words, data at a row X and a column Y in frame data FM2n represented by FMD2n(X, Y) is obtained by {FMD2n(X,Y)=FLD2n−1(X,Y)+FLD2n(X,Y)}, where data at the row X and the column Y in field data FL2n is FLD2n(X, Y).

Next, the field data 200 will be described in detail below.

Hereinafter, the case where the readout position is changed every two fields (m=2) in H¼V¼ selective readout mode in which data is read from ¼ of M rows and ¼ of N columns will be described as an example.

Figure 3:
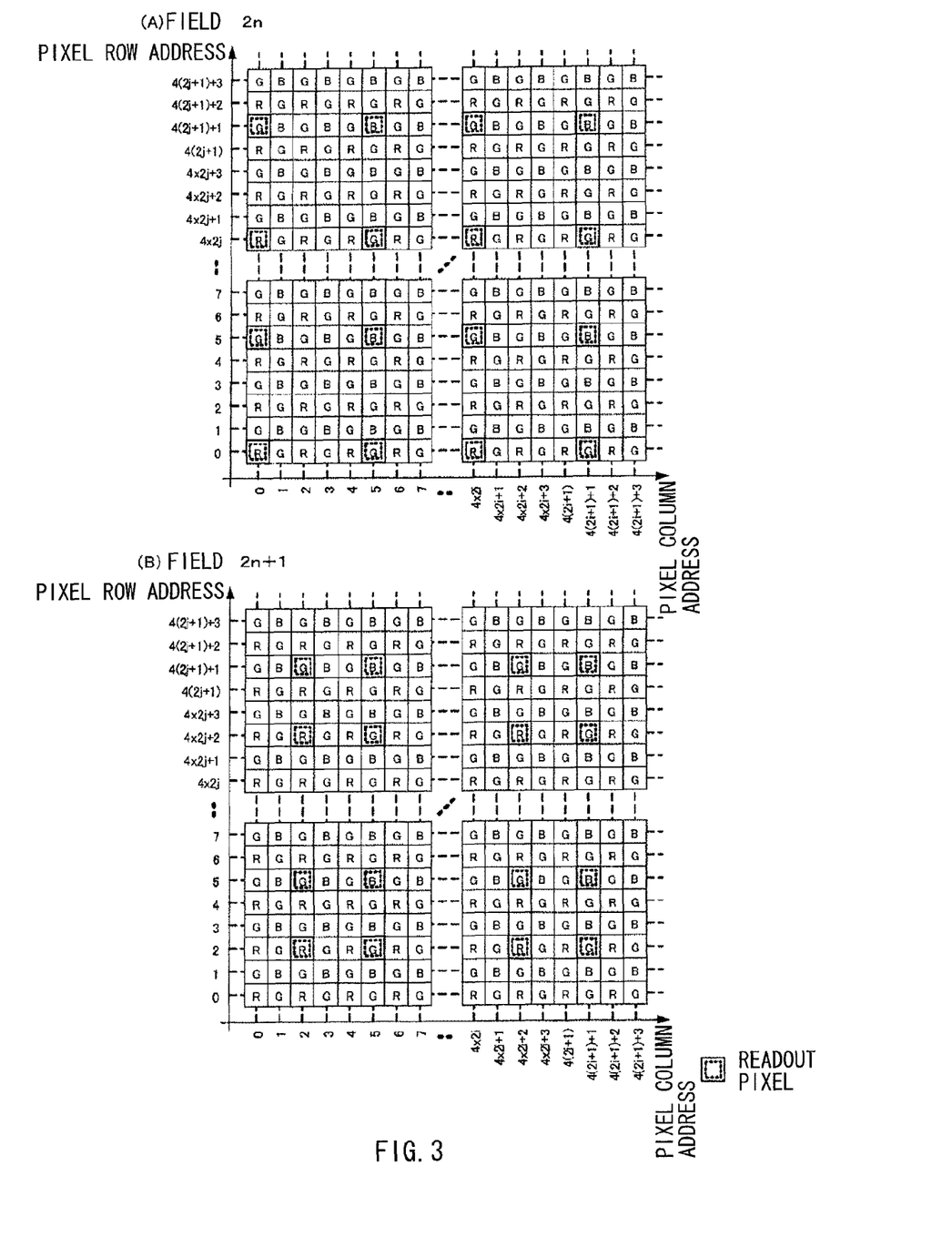
FIG. 3 is a diagram illustrating an example of readout addresses in each field in the case of m=2 in a H¼V¼ selective readout mode in the first embodiment.

FIGS. 3(A) and 3(B) illustrate an example of readout addresses in each field in the case of m=2 in the H¼V¼ selective readout mode in the first embodiment.

FIGS. 3(A) and 3(B) illustrate readout addresses in a field 2n and readout addresses in a field 2n+1, respectively.

Herein, n is an arbitrary integer.

In the example in FIGS. 3(A) and 3(B), in the field 2n, signals are read from pixels at intersection points of a 4×2j-th row and a 4×(2j+1)+1-th row, and a 4×2i-th column and a 4×(2i+1)+1-th column in pixels arranged in a matrix with M rows and N columns.

Herein, i and j each are an arbitrary integer satisfying 4×(2j+1)+3<M, and 4×(2i+1)+3<N.

Moreover, in the field 2n+1, signals are read from pixels at intersection points of a 4×2j+2-th row and a 4×(2j+1)+1-th row, and a 4×2i+2-th column and a 4×(2i+1)+1-th column.

Thus, the image pickup device 100 changes the readout positions of pixels in an odd-numbered row 2j and an odd-numbered column 2i from one field to another in selective readout mode.

Figure 4:
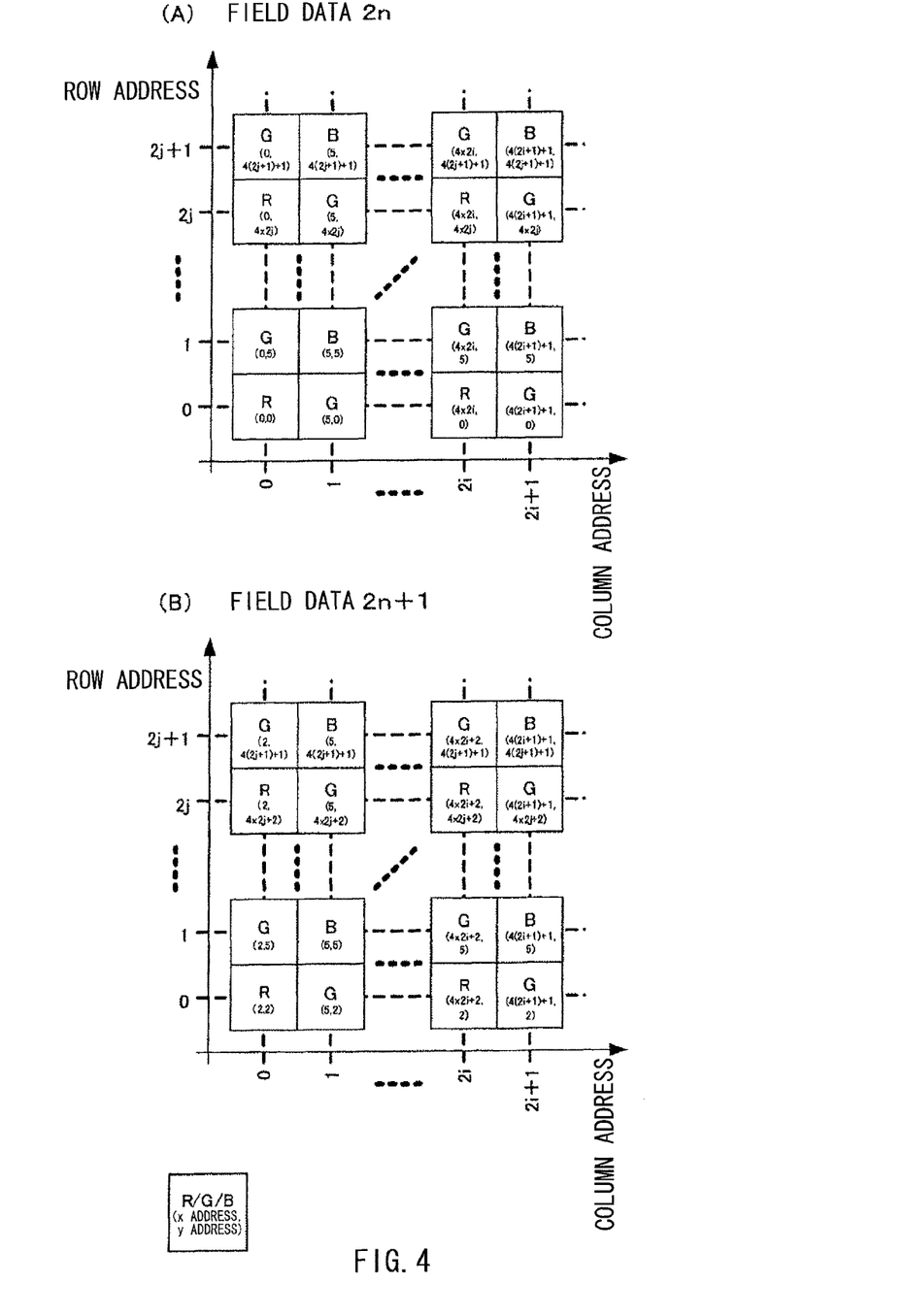
FIG. 4 is a diagram illustrating an example of field data 200 in the case where signals are read from pixels at addresses illustrated in FIG. 3.

FIGS. 4(A) and 4(B) illustrate an example of the field data 200 in the case where signals are read from pixels at addresses illustrated in FIG. 3.

As illustrated in FIG. 4(A), data from pixels in a 4×2j-th row and data from pixels in a 4(2j+1)+1-th row are supplied to an even-numbered row 2j and an odd-numbered row 2j+1, respectively, in the field data FL2n in the field 2n.

Data from pixels in a 4×2i-th column and data from pixels in a 4(2i+1)+1-th column are supplied to an even-numbered column 2i and an odd-numbered column 2i+1, respectively.

Moreover, as illustrated in FIG. 4(B), data from pixels in a 4×2j+2-th row and data from pixels in a 4(2j+1)+1-th row are supplied to an even-numbered row 2j and an odd-numbered row 2j+1, respectively, in the field data FL2n+1 in the field 2n+1.

Data from pixels in a 4×2i+2-th column and data from pixels in a 4(2i+1)+1-th column are supplied to an even-numbered column 2i and an odd-numbered column 2i+1, respectively.

In the field data 200 obtained in such a manner, in a single field, spatial phases between an even-numbered row and an odd-numbered row, and between an even-numbered column and an odd-numbered column are shifted.

For example, in the field 2n, while data from the pixels in a 4×2j-th row is supplied to an even-numbered row 2n in field data, data from pixels in a 4(2i+1)+1)-th row is supplied to an odd-numbered row 2n+1, and a sampling centroid is shifted by one pixel.

A similar thing occurs in a column direction.

Therefore, when signal processing is performed based on the premise that even-numbered rows and odd-numbered rows in field data have an equal pitch as in the case of all-pixel readout mode, a processed image has jaggies.

On the other hand, in the image pickup device 100, plural sets of field data 200 with different readout positions are added up to allow sampling centroids in even-numbered rows and sampling centroids in odd-numbered rows to have an equal pitch.

Figure 5:
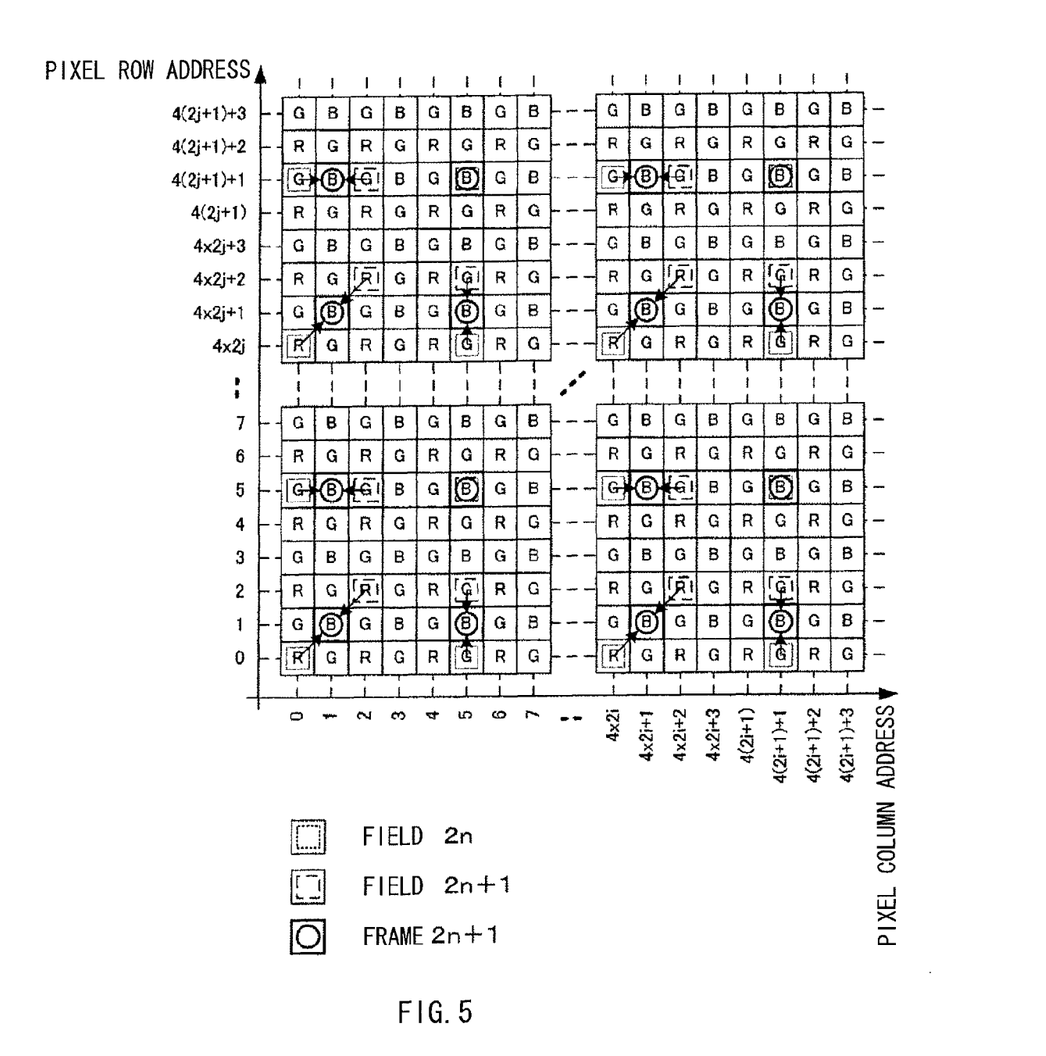
FIG. 5 is a diagram illustrating a sampling centroid in frame data FM2$n$+1 obtained by performing adding-up of field data FL2$n$ and FL2$n$+1.

FIG. 5 illustrates a sampling centroid in frame data FM2n+1 obtained by performing adding-up of the field data FL2n and FL2n+1.

As described above, the row address of a pixel from which data is supplied to an even-numbered row 2j in the field data FL2n is 4×2j, and the row address of a pixel from which data is supplied to an even-numbered row 2j in the field data FL2n+1 is 4×2j+2.

Therefore, when data from the even-numbered row 2j in the field data FL2n and FL2n+1 are added up, a sampling centroid in a row direction is located at a pixel at a row address 4×2j+1.

On the other hand, the row address of a pixel from which data is supplied to an odd-numbered row 2j+1 is 4×(2j+1)+1 in both of the field data FL2n and FL2n+1, and the centroid is not changed even after adding-up.

Thus, a sampling centroid in a k-th row (k is an arbitrary integer satisfying 0<4k<M) in the frame data FM2n+1 is 4k+1 in both of even-numbered rows and odd-numbered rows, and centroid displacement in rows is eliminated.

Likewise, the column address of a pixel from which data is supplied to an even-numbered column 2i in the field data FL2n is 4×2i, and the column address of a pixel from which data is supplied to an even-numbered row 2i in the field data FL2n+1 is 4×2i+2.

Therefore, when data from an even-numbered row 2i in the field data FL2n and FL2n+1 are added up, a sampling centroid in a column direction is located at a pixel in a column address 4×2i+1.

On the other hand, the column address of a pixel from which data is supplied to an odd-numbered column 2i+1 is 4×(2j+1) in both of the field data FL2n and FL2n+1, and the centroid is not changed even after adding-up.

Thus, a sampling centroid in an l-th column (L is an arbitrary integer satisfying 0<4l<N) in the frame data FM2$n$+1 is 4$l$+1 in both of even-numbered columns and odd-numbered columns, and centroid displacement in columns is eliminated.

As described above, in selective readout mode, the image pickup device 100 adds up plural sets of field data 200 with different readout positions to produce the frame data 210, thereby allowing sampling centroids of pixels in rows and sampling centroids of pixels in columns to be fixed, and reducing jaggies.

It is to be noted that when m sets of field data are added up, a pixel readout address to be designated for readout in each field may be selected to allow centroids in rows and centroids in columns to be fixed, and is not limited to the examples in FIGS. 3 to 5.

Moreover, in the image pickup device 100, when adding-up of plural sets of field data 200 is performed, the S/N ratio of the frame data 210 is improved.

For example, the case where a pixel generates an electrical signal with use of a photodiode, and the readout position is changed every two fields (m=2) will be described below.

For the sake of simplification, output values of respective pixels in the fields 2$n$ and 2$n$+1 are equal and SFD, and noise is NFD.

Typically, under a condition that there is light of a certain amount, photon shot noise accompanying photoelectric conversion by the photodiode is a dominant factor of the noise NFD, and NFD=(SFD)$^{1/2}$ is established.

In this case, SFM=2SFD and NFM=((NFD)2+(NFD)2)$^{1/2}$=2$^{1/2}$NFD=(2SFD)$^{1/2}$ are established, where a signal after adding-up is SFM, and noise is NFM.

When S/N ratios before and after adding-up are compared to each other, the S/N ratio before adding-up is SFD/NFD=(SFD)$^{1/2}$ and the S/N ratio after adding-up is SFM/NFM=2SFD/(2SFD)$^{1/2}$=(2SFD)$^{1/2}$, and it is obvious that after adding-up, the S/N ratio is improved by 2$^{1/2}$ times.

Figure 6:
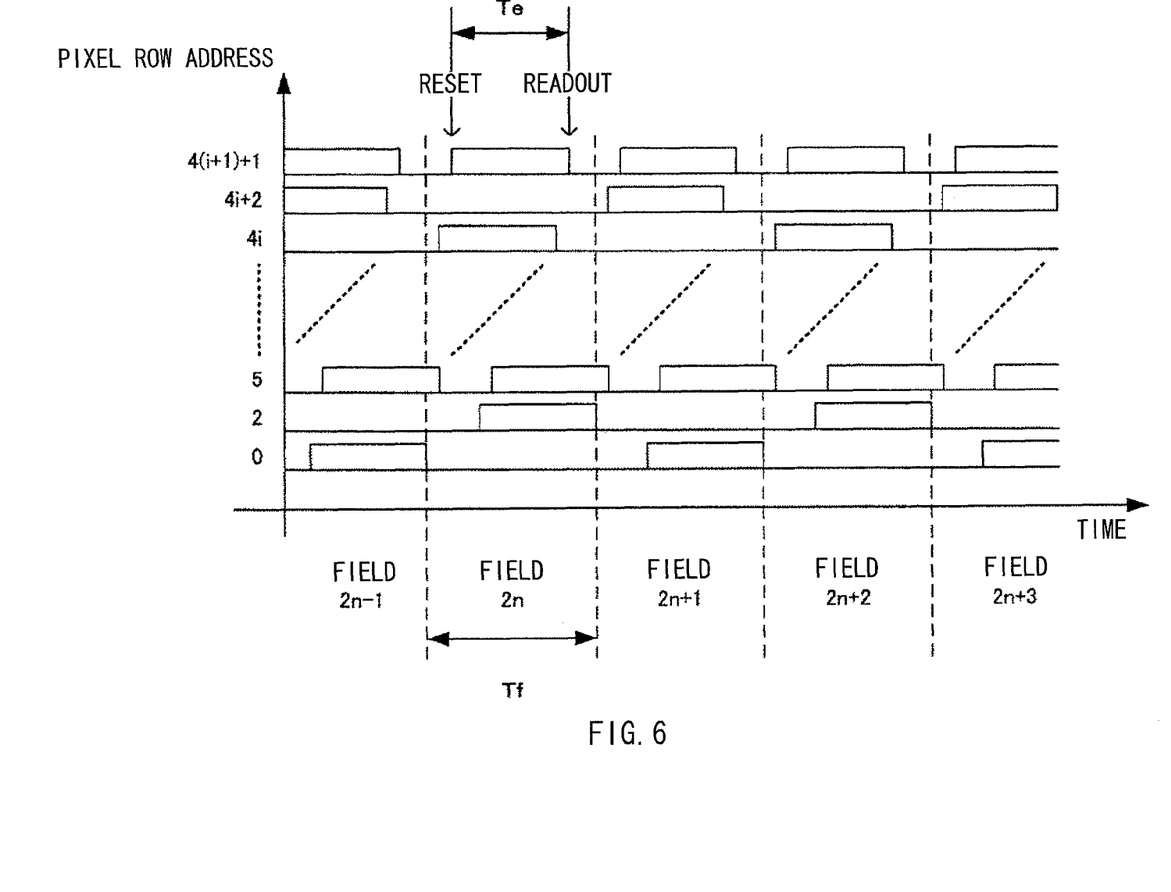
FIG. 6 is a diagram illustrating an example of reset (electronic shutter) and readout timings of each pixel in the image pickup device according to the first embodiment.

FIG. 6 illustrates an example of reset (electronic shutter) and readout timings of each pixel in the image pickup device 100.

FIG. 6 illustrates the case where the readout position is changed every two fields (m=2).

A horizontal axis and a vertical axis indicate time and the row address of a pixel, respectively.

Data is read from a pixel at a row address 0 at the beginning of the field 2$n$. Likewise, data is read from a pixel at a row address 2 at the beginning of the field 2$n$+1.

In the embodiment, signals are read from a same pixel at a row address 4($i$+1)+1 in an odd-numbered row 2$i$+1 in fields 2$n$ and 2$n$+1.

Therefore, a storage time Te from resetting an electrical signal from each pixel to reading a signal is necessary to be shorter than a field period Tf, i.e., a length of one field.

As described above, in the image pickup device 100 of the embodiment, in selective readout mode, adding-up of plural sets of field data 200 with different readout positions is performed to produce the frame data 210.

Therefore, the sampling centroids of pixels in rows are allowed to be fixed, and jaggies are allowed to be reduced.

Moreover, when the frame data is produced by adding up a plurality of fields, the S/N ratio and image quality are allowed to be improved.

(2. Second Embodiment)

As a whole configuration of an image pickup device according to a second embodiment of the invention, as in the case of the first embodiment, the configuration in FIG. 1 is allowed to be used.

An image pickup device 100A is similar to that in the first embodiment in that the image pickup device 100A supports at least all-pixel readout mode in which signals are read from all pixels and selective readout mode in which signals are intermittently read by skipping a row or a column, and is allowed to control an operation mode by the operation mode control signal 300.

In selective readout mode, the image pickup device 100A obtains, from the photoelectric conversion section 120, data different from one filed to another, and adds up the data to produce and output frame data.

Also in the second embodiment, the image pickup device 100A adds up plural sets of field data 200 to produce frame data.

Moreover, as in the case of the first embodiment, when the frame data is produced, the image pickup device 100A adds up data at a same address in field data.

Figure 7:
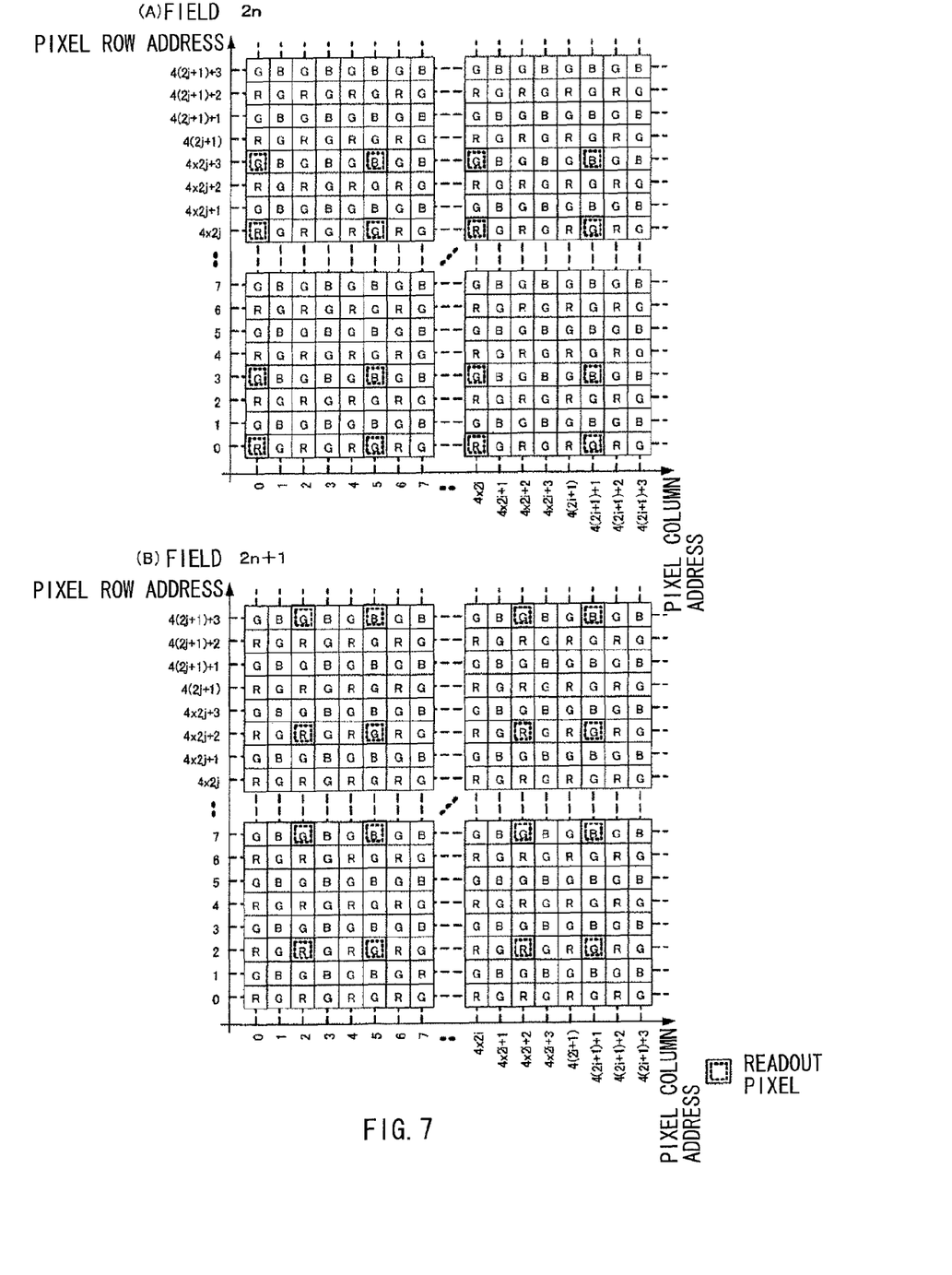
FIG. 7 is a diagram illustrating an example of readout addresses in each field in an image pickup device according to a second embodiment of the invention.

FIG. 7 illustrates an example of readout addresses in each field in the image pickup device according to the second embodiment of the invention.

FIG. 7 illustrates the case where the readout position is changed every two fields (m=2) in H¼V¼ selective readout mode in which data is read from ¼ of M rows and ¼ of N columns.

In the image pickup device 100A according to the second embodiment, data is read from pixel addresses different from one of a plurality of fields being to be subjected to adding-up to another of the plurality of fields.

In an example in FIG. 7, a signal is read from a pixel at a row address 4$x$2$j$ in an even-numbered row 2$i$ of field data FD2$n$ in the field 2$n$, and a signal is read from a pixel at a row address 4$x$2$j$+3 in an odd-numbered row 2$i$+1.

On the other hand, a signal is read from a pixel at a row address 4$x$2$j$+2 in an even-numbered row 2$i$ in field data FD2$n$+1 in the field 2$n$+1, and a signal is read from a pixel at a row address 4$x$(2$j$+1)+3 in an odd-numbered row 2$i$+1.

Signals are read from pixels at intersection points of a 4$x$2$j$-th row and a 4$x$2$j$+3-th row, and a 4$x$2$i$-th column and a 4$x$(2$i$+1)+1-th column in pixels arranged in a matrix with M rows and N columns.

Herein, i and j each are an arbitrary integer satisfying 4$x$(2$j$+1)+3<M and 4$x$(2$i$+1)+3<N.

Moreover, in the field 2$n$+1, signals are read from pixels at intersection points of a 4$x$2$j$+2-th row and a 4$x$(2$j$+1)+3-th row, and a 4$x$2$i$+2-th column and a 4$x$(2$i$+1)+1-th column.

Herein, data from pixels in the 4$x$2$i$-th column and data in the 4(2$i$+1)+1-th column are supplied to an even-numbered column 2$i$ and an odd-numbered column 2$i$+1, respectively, in field data FL2$n$.

Then, the second embodiment is similar to the first embodiment in that data from a pixel in the 4$x$2$i$+2-th column and data from a pixel in the 4(2$i$+1)+1-th column are supplied to an even-numbered column 2$i$ and an odd-numbered column 2$i$+1, respectively, in field data FL2$n$+1.

As a result, the addresses of pixels from which data is to be read in all of R, G and B pixels are different between the field 2$n$ and the field 2$n$+1.

The address of each pixel is represented by (column address of the pixel, row address of the pixel).

With regard to R pixels, in the field 2$n$, data is read from a pixel at (4$x$2$i$, 4$x$2$j$). On the other hand, in the field 2$n$+1, data is read from a pixel at (4$x$2$i$+2, 4$x$2$j$+2).

With regard to G pixels, in the field 2$n$, data is read from pixels at (4$x$2$i$, 4$x$2$j$+3) and (4$x$(2$i$+1)+1, 4$x$2$j$). On the other hand, in the field 2$n$+1, data is read from pixels at (4$x$2$i$+2, 4$x$(2$j$+1)+3) and (4$x$(2$i$+1)+1, 4$x$2$j$+2).

Moreover, with regard to B pixels, in the field $2n$, data is read from a pixel at $(4x(2i+1)+1, 4x2j+3)$. On the other hand, in the field $2n+1$, data is read from a pixel at $(4x(2i+1)+1, 4x(2j+1)+3)$.

Even in the case where adding-up of field data $FL2n$ in the field $2n$ and field data $FL2n+1$ in the field $2n+1$ read in such a manner is performed to produce frame data $FM2n+1$, in the frame data $FM2n+1$, sampling centroids in rows and sampling centroids in columns have an equal pitch.

Figure 8:
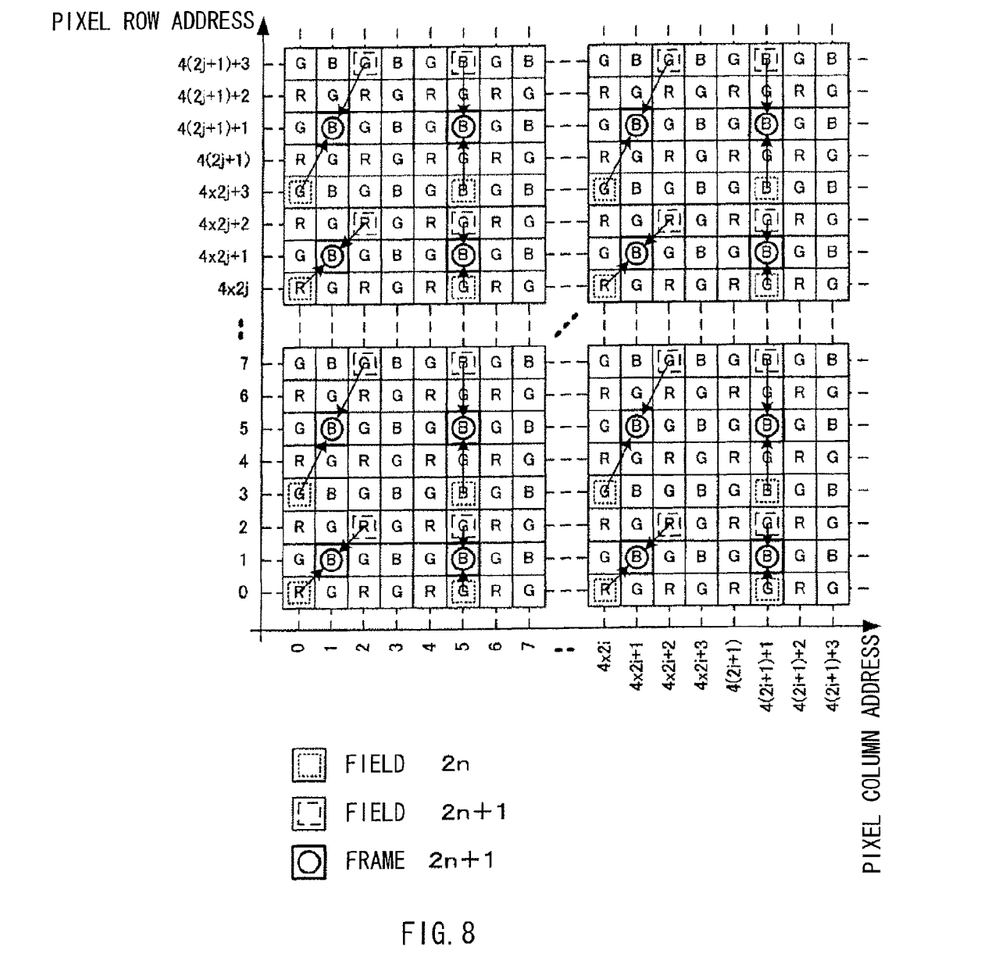
FIG. 8 is a diagram illustrating sampling centroids at pixel addresses in frame data FM2$n$+1 in the second embodiment.

FIG. 8 illustrates sampling centroids at pixel addresses in frame data $FM2n+1$.

In FIG. 8, a centroid in an even-numbered row $2i$ is located at a pixel at a row address $4x2i+1$, because the row address of a pixel in the field $2n$ is $4x2i$, and the row address of a pixel in the field $2n+1$ is $4x2i+2$.

On the other hand, a centroid in an odd-numbered row $2i+1$ is located at a pixel at a row address $4x(2i+1)+1$, because the row address of a pixel in the field $2n$ is $4x2i+3$, and the row address of a pixel in the field $2n+1$ is $4x(2i+1)+3$.

Thus, a sampling centroid in a k-th row (k is an arbitrary integer satisfying $0<4k<M$) in the frame data $FM2n+1$ is $4k+1$ in both of even-numbered rows and odd-numbered rows, and centroid displacement in rows is eliminated.

Likewise, the column address of a pixel from which data is supplied to an even-numbered column $2i$ in the field data $FL2n$ is $4x2i$, and the column address of a pixel from which data is supplied to an even-numbered column $2i$ in the field data $FL2n+1$ is $4x2i+2$.

Therefore, when data from the even-numbered row $2i$ in the field data $FL2n$ and the field data $FL2n+1$ are added up, a sampling centroid in a column direction is located at a pixel at a column address $4x2i+1$.

On the other hand, the column address of a pixel from which data is supplied to an odd-numbered row $2i+1$ is $4x(2j+1)+1$ in both of the field data $FL2n$ and $FL2n+1$, and the centroid is not changed even after adding-up.

Thus, a sampling centroid in an l-th row (L is an arbitrary integer satisfying $0<4l<N$) in the frame data $FM2n+1$ is $4l+1$ in both of even-numbered columns and odd-numbered columns, and centroid displacement in columns is eliminated.

As described above, in selective readout mode, the image pickup device 100 adds up plural sets of field data 200 with different readout positions to produce the frame data 210, thereby allowing sampling centroids of pixels in rows and sampling centroids in columns of pixels to be fixed, and reducing jaggies.

It is to be noted that when m sets of field data are added up, a pixel address to be designated for readout in each field may be selected to allow centroids in rows and centroids in columns to be fixed, and is not limited to the examples in FIGS. 3 to 5.

Moreover, also in the second embodiment, as in the case of the first embodiment, when adding-up of plural sets of field data 200 is performed, the S/N ratio of the frame data 210 is improved.

Next, a storage time for each pixel in the second embodiment will be described below.

In the second embodiment, signals are read from pixels different from one of a plurality of fields being to be subjected to adding-up to another of the plurality of fields. Therefore, in respective pixels, signals are allowed to be accumulated during a plurality of fields.

For example, in the case where the readout position is changed every m fields, and m sets of field data are added up to produce one set of frame data, Te is allowed to be set within a range of $0<Te<m\times Tf$, where a period of one field is Tf, and the storage time of each pixel is Te.

Figure 9:
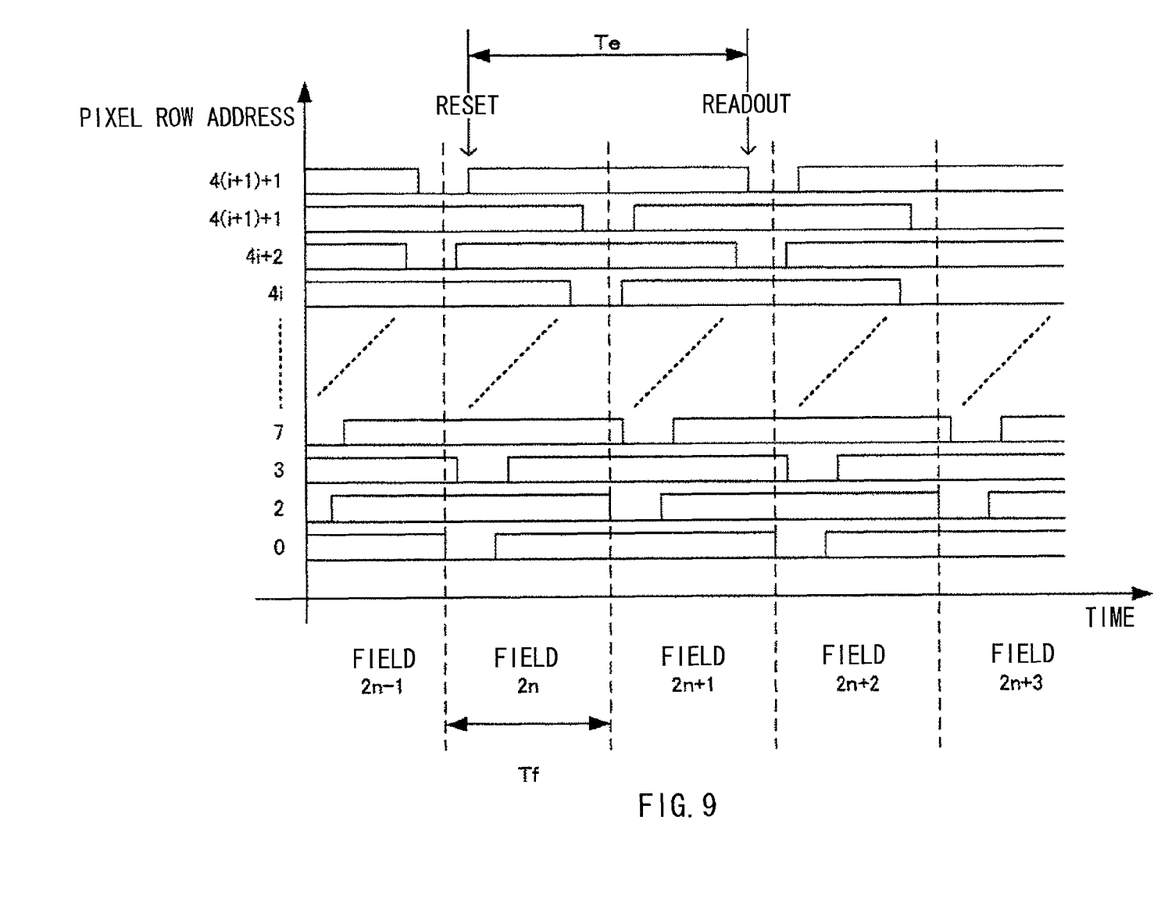
FIG. 9 is a diagram illustrating an example of reset (electronic shutter) and readout timings of each pixel in the second embodiment.

FIG. 9 illustrates an example of reset (electronic shutter) and readout timings of each pixel in the second embodiment.

FIG. 9 illustrates the case where the readout position is changed every two fields (m=2).

In FIG. 9, a horizontal axis and a vertical axis indicate time and the row address of a pixel, respectively.

Data is read from a pixel at a row address 0 at the beginning of the field $2n$. After that, data is not read from a pixel at the row address 0 until a field $2n+2$.

Thus, the pixel at the row address 0 is allowed to be reset from the beginning of the field $2n$ to the beginning of the field $2n+2$.

Therefore, the storage time Te from resetting the electrical signal of each pixel to reading a signal is allowed to be set within a range of a field period Tfx2 at the maximum.

The maximum storage time is allowed to be increased by extending the field period Tf; however, a frame rate is reduced.

On the other hand, as described above, when signals are read from pixels completely different from one of fields being to be subjected to adding-up to another of the fields, the maximum storage time is allowed to be longer than the field period Tf.

In other words, while the frame rate is kept unchanged, the maximum storage time is allowed to be increased.

Thus, in the image pickup device of the second embodiment, in selective readout mode, adding-up of plural sets of field data 200 with different readout positions is performed to produce the frame data 210.

Therefore, sampling centroids of pixels in rows are allowed to be fixed, and jaggies are allowed to be reduced.

Moreover, when the frame data is produced by adding-up processing for a plurality of fields, the S/N ratio and image quality are allowed to be improved.

Further, when signals are read from pixels completely different from one of fields being to be subjected to adding-up to another of the fields, the maximum storage time is allowed to be longer than the field period Tf. In other words, while the frame rate is kept unchanged, the maximum storage time is allowed to be increased.

(3. Third Embodiment)

Next, a third embodiment of the invention will be described below.

In the third embodiment, in selective readout mode, plural sets of pixel data of a same color in a set of field data are added up to allow centroids to be fixed, thereby producing frame data.

As a whole configuration of an image pickup device according to the third embodiment of the invention, as in the case of the first embodiment, the configuration in FIG. 1 is allowed to be used.

The sampling controller 140 in the third embodiment controls, in response to the operation mode control signal 400, to select a pixel from which a signal is to be read from the pixels arranged in a matrix with M rows and N columns.

The sampling controller 140 sequentially reads signals from all of the pixels when the operation mode control signal 300 designates all-pixel readout mode.

On the other hand, when the operation mode control signal 300 designates selective readout mode, the sampling controller 140 intermittently selects rows or columns of pixels to read signals from some of pixels.

As in the first embodiment, the photoelectric conversion section 120 outputs an electrical signal from the pixel 121 located in a specific row to the readout circuit 130 in response to a signal from the sampling controller 140.

Moreover, as in the case of the first embodiment, the readout circuit 130 reads the electrical signal from a specific column in response to the control signal CTL from the sampling controller 140, and performs AD conversion on the electrical signal to output a resultant signal as field data 200.

Alternatively, the readout circuit 130 may read electrical signals from all columns in response to a control signal from the sampling controller 140, and may perform AD conversion on the electrical signals, and output only a resultant signal from a specific column as the field data 200.

The signal processing section 150 performs signal processing on the field data 200 supplied from the readout circuit 130 to output resultant data as frame data 210 to an external device.

The signal processing section 150 includes the adding-up section 151 and the memory 152, and selects, in response to the operation mode control signal 300, whether to perform adding-up of plural sets of pixel data in the field data 200 to output resultant data.

Next, the field data 200 and adding-up processing in the third embodiment will be described in detail below.

Figure 10:
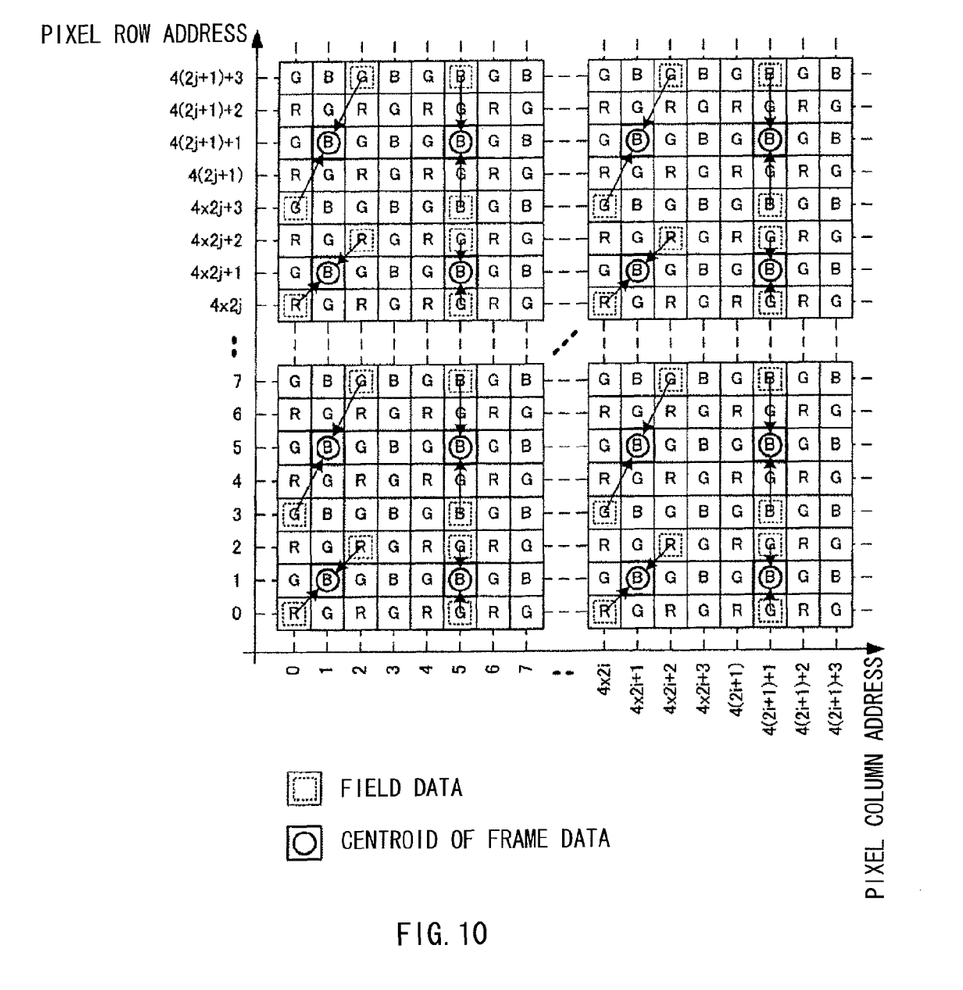
FIG. 10 is a diagram illustrating an example in the case where adding-up processing for two pixels is performed in a H¼V¼ selective readout mode in a third embodiment.

FIG. 10 illustrates an example of the case where adding-up processing for two pixels is performed in the H¼V¼ selective readout mode in the third embodiment.

Herein, the address of each pixel in the field data 200 is represented by (column address of the pixel, row address of the pixel).

In an example in FIG. 10, with regard to R pixels, data is read from pixels at ($4 \times 2i$, $4 \times 2j$) and ($4 \times 2i+2$, $4 \times 2j+2$).

The signal processing section 150 performs adding-up processing for these two pixels to output resultant data as data at ($2i$, $2j$) in the frame data 210.

Moreover, with respect to G pixels, adding-up processing for ($4 \times 2i$, $4 \times 2j+3$) and ($4 \times 2i+2$, $4 \times (2j+1)+3$) is performed to output resultant data as data at ($2i$, $2j+1$) in the frame data 210. Then, addition processing for ($4 \times (2i+1)+1$, $4 \times 2j$) and ($4 \times (2i+1)+1$, $4 \times 2j+2$) is performed to output resultant data as data at ($2i+1$, $2j$) in the frame data 210.

Further, with regard to B pixels, adding-up processing for ($4 \times (2i+1)+1$, $4 \times 2j+3$) and ($4 \times (2i+1)+1$, $4 \times (2j+1)+3$) is performed to output resultant data as data at ($2i+1$, $2j+1$) in the frame data 210.

Thus, sampling centroids in rows and sampling centroids in columns in frame data are allowed to be fixed by performing adding-up processing for a plurality of pixels.

For example, in the case of R pixels from which data is supplied to ($2i$, $2j$) in the frame data 210, a sampling centroid is located at ($4 \times 2i+1$, $4 \times 2j+1$).

Moreover, in the case of B pixels from which data is supplied to ($2i+1$, $2j+1$) in the frame data 210, a sampling centroid is located at ($4 \times 2(i+1)+1$, $4 \times 2(j+1)+1$).

In other words, a sampling centroid in a k-th row (k is an arbitrary integer satisfying $0<4k<M$) in frame data is $4k+1$ in both of even-numbered rows and odd-numbered rows. A sampling centroid in an l-th row (L is an arbitrary integer satisfying $0<4l<N$) is $4l+1$ in both of even-numbered columns and odd-numbered columns, and centroid displacement in rows and columns is eliminated.

As described above, in selective readout mode, an image pickup device 100B performs adding-up processing for a plurality of pixels in field data 200 to produce the frame data 210, thereby allowing sampling centroids of pixels in rows and sampling centroids of pixels in columns to be fixed, and reducing jaggies.

It is to be noted that when data from a plurality of pixels are added up, a pixel address to be designated for readout in each field data may be selected to allow centroids in rows and centroids in columns to be fixed, and are not limited to the example in FIG. 10.

As described above, in the third embodiment of the invention, adding-up is allowed to be performed in each row. Such adding-up processing is allowed to be performed sequentially from one row to another. Therefore, it is enough for the memory 152 to have a size for storing data of one row at the minimum.

Moreover, also in the third embodiment, as in the case of the first embodiment, adding-up of plural sets of pixel data is performed to produce the frame data 210, and accordingly, the S/N ratio is allowed to be improved.

As in the case of the first embodiment, the storage time Te in the image pickup device 100B is necessary to be shorter than the field period Tf.

As described above, in selective readout mode, the image pickup device 100B of the third embodiment adds up plural sets of field data 200 with different readout positions to produce the frame data 210.

Therefore, the sampling centroids of pixels in rows are allowed to be fixed, and jaggies are allowed to be reduced.

Moreover, when the frame data is produced by adding-up processing for a plurality of fields, the S/N ratio and image quality are allowed to be improved.

Further, the adding-up processing is allowed to be performed sequentially from one row to another; therefore, the size necessary for the memory 152 is reduced to the size large enough for storing data of one row.

As described above, according to the first embodiment, the second embodiment, and the third embodiment, the following effects are allowed to be obtained.

In the image pickup device according to the first embodiment of the invention, in selective readout mode, adding-up of plural sets of field data 200 with different readout positions is performed to produce the frame data 210.

Therefore, the sampling centroids of pixels in rows are allowed to be fixed, and jaggies are allowed to be reduced.

Moreover, when the frame data is produced by adding-up processing for a plurality of fields, the S/N ratio and image quality are allowed to be improved.

Moreover, in the image pickup device according to the second embodiment of the invention, in selective readout mode, adding-up of plural sets of field data 200 with different readout positions is performed to produce the frame data 210.

Therefore, the sampling centroids of pixels in rows are allowed to be fixed, and jaggies are allowed to be reduced.

Moreover, when the frame data is produced by adding-up processing for a plurality of fields, the S/N ratio and image quality are allowed to be improved.

Further, when signals are read from pixels completely different from one of fields being to be subjected to adding-up to another of the fields, the maximum storage time is allowed to be longer than the field period Tf.

In other words, while the frame rate is kept unchanged, the maximum storage time is allowed to be increased.

Further, in the image pickup device according to the third embodiment of the invention, in selective readout mode, adding-up of plural sets of field data 200 with different readout positions is performed to produce the frame data 210.

Therefore, the sampling centroids of pixels in rows are allowed to be fixed, and jaggies are allowed to be reduced.

Moreover, when the frame data is produced by adding-up processing for a plurality of fields, the S/N ratio and image quality are allowed to be improved.

Further, the adding-up processing is allowed to be performed sequentially from one row to another; therefore, the size necessary for the memory 152 is reduced to the size large enough for storing data of one row.

The invention claimed is:

1. An image pickup device comprising:
a pixel section including a plurality of pixels arranged in a matrix;
a readout circuit that performs a conversion process on an analog signal generated in the pixel section to output a resultant signal as field data;
a controller that, in response to an operation mode control signal, operates to select a pixel from which a signal is to be read in the pixel section; and
a signal processing section that performs signal processing on the field data supplied from the readout circuit to output resultant data as frame data,
wherein,
the controller (i) operates to sequentially read signals from all of the pixels when the operation mode control signal designates an all-pixel readout mode, and (ii) operates to read a signal from a different pixel while varying a readout position from one field to another field when the operation mode control signal designates a selective readout mode, and
the signal processing section (i) performs signal processing on a set of field data of a single field to output resultant data as frame data when the operation mode control signal designates the all-pixel readout mode, and (ii) adds up plural sets of field data over a plurality of fields to output resultant data as frame data when the operation mode control signal designates the selective readout mode, a pixel address designated for readout in each field being selected such that sampling centroids in rows and sampling centroids in columns are fixed, respectively, when the plural sets of field data are added up.

2. The image pickup device according to claim 1, wherein the signal processing section performs adding-up or averaging of data at a corresponding coordinate over a plurality of fields for each of all pixels to produce a single set of image data from plural sets of image data.

3. The image pickup device according to claim 1, wherein the readout position is changed every m fields and the signal processing section adds up m sets of field data to produce one set of image data when the operation mode control signal designates the selective readout mode, where m is an arbitrary integer.

4. The image pickup device according to claim 1, wherein the signal processing section adds up the plural sets of field data over the plurality of fields so that the sampling centroids in rows and the sampling centroids in columns are fixed, respectively, when the operation mode control signal designates the selective readout mode.

5. The image pickup device according to claim 1, wherein the controller operates to allow a readout pixel address in one of the plurality of fields to be different from a readout pixel address in another one of the plurality of fields, the plurality of fields being subjected to adding-up processing by the signal processing section.

* * * * *